(12) United States Patent
Kwack et al.

(10) Patent No.: US 8,125,585 B2
(45) Date of Patent: Feb. 28, 2012

(54) LIQUID CRYSTAL DISPLAY DEVICE AND FABRICATING METHOD THEREOF

(75) Inventors: Hee Young Kwack, Seoul (KR); Seung Ho Heo, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 852 days.

(21) Appl. No.: 11/640,332

(22) Filed: Dec. 18, 2006

(65) Prior Publication Data

US 2007/0273804 A1 Nov. 29, 2007

(30) Foreign Application Priority Data

Dec. 27, 2005 (KR) ........................ 10-2005-0130755

(51) Int. Cl.
*G02F 1/136* (2006.01)
(52) U.S. Cl. ........................................................ 349/43
(58) Field of Classification Search ................... 349/39, 349/43
See application file for complete search history.

(56) References Cited

U.S. PATENT DOCUMENTS

| | | | | |
|---|---|---|---|---|
| 6,624,446 B2 * | 9/2003 | Kim | ................ | 257/72 |
| 7,336,336 B2 * | 2/2008 | Yoo et al. | ....................... | 349/187 |
| 7,517,620 B2 * | 4/2009 | Kim et al. | ......................... | 430/20 |
| 7,518,666 B2 * | 4/2009 | Jung et al. | ........................ | 349/43 |
| 2003/0020860 A1 * | 1/2003 | Hong | ............................. | 349/139 |
| 2004/0041959 A1 * | 3/2004 | Yoo et al. | ........................ | 349/43 |
| 2004/0263706 A1 * | 12/2004 | Cho et al. | ........................ | 349/43 |
| 2004/0263757 A1 * | 12/2004 | Kwon | ........................... | 349/149 |
| 2005/0270452 A1 * | 12/2005 | Ahn et al. | ..................... | 349/114 |

* cited by examiner

*Primary Examiner* — Thanh-Nhan Nguyen
(74) *Attorney, Agent, or Firm* — Morgan, Lewis & Bockius LLP

(57) ABSTRACT

A thin film transistor array substrate includes a gate line provided on a substrate, a data line crossing the gate line to define a pixel area, a gate insulating film between the gate line and the data line at the crossing of the gate line and data line, a thin film transistor adjacent to the crossing of the gate line and the data line, a protective film covering the thin film transistor, a pixel electrode on the pixel area and electrically connected to a drain electrode of the thin film transistor, a gate pad connected to the gate line, a data pad connected to the data line, a lower data link electrode connected to the data line, an upper data link electrode connected to the data line and overlapping one end of the lower data link electrode, and a link electrode connecting the lower data link electrode via a first contact hole passing through the protective film and the gate insulating film at a first area of the substrate in which the protective film is directly provided on the gate insulating film.

15 Claims, 19 Drawing Sheets

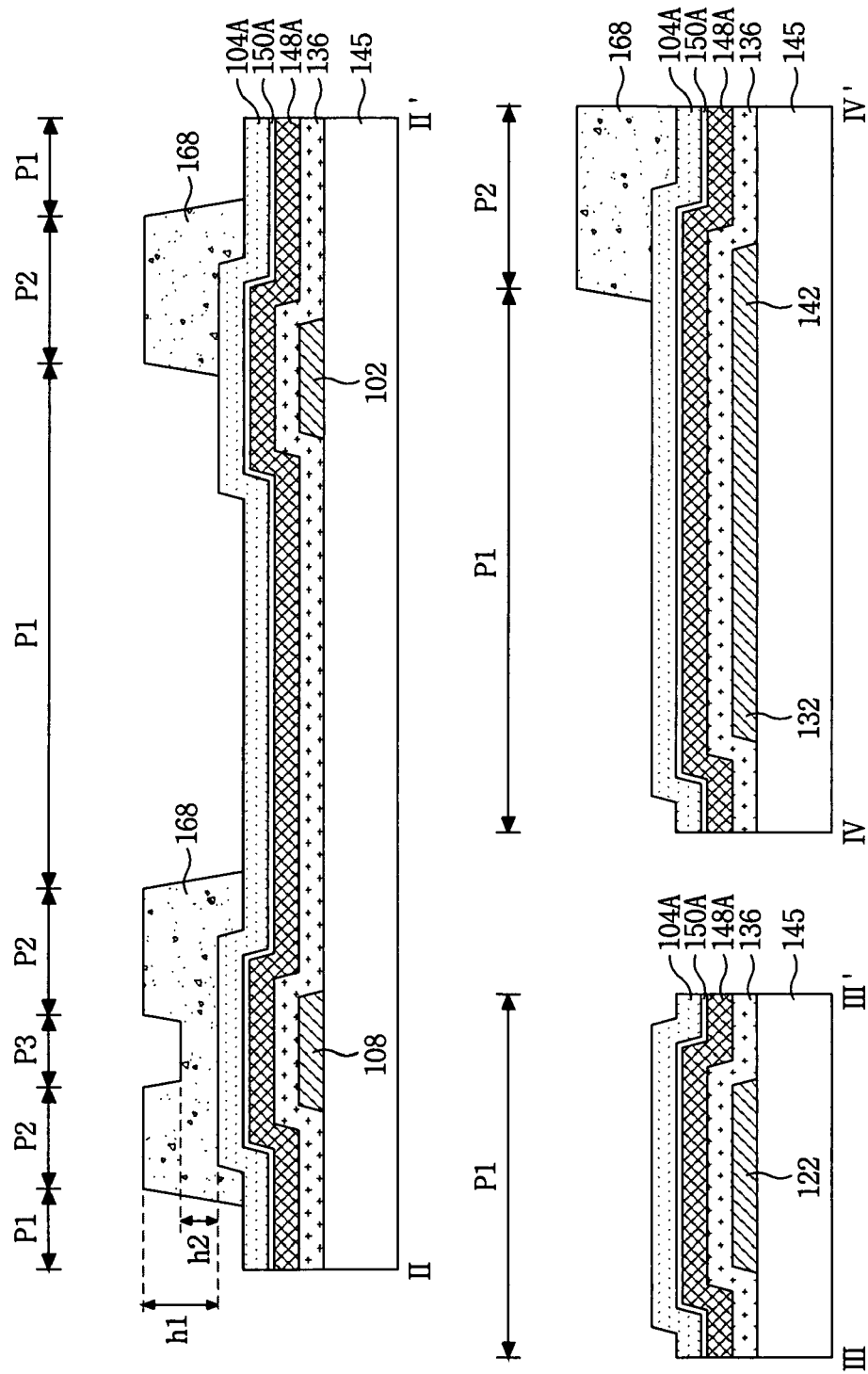

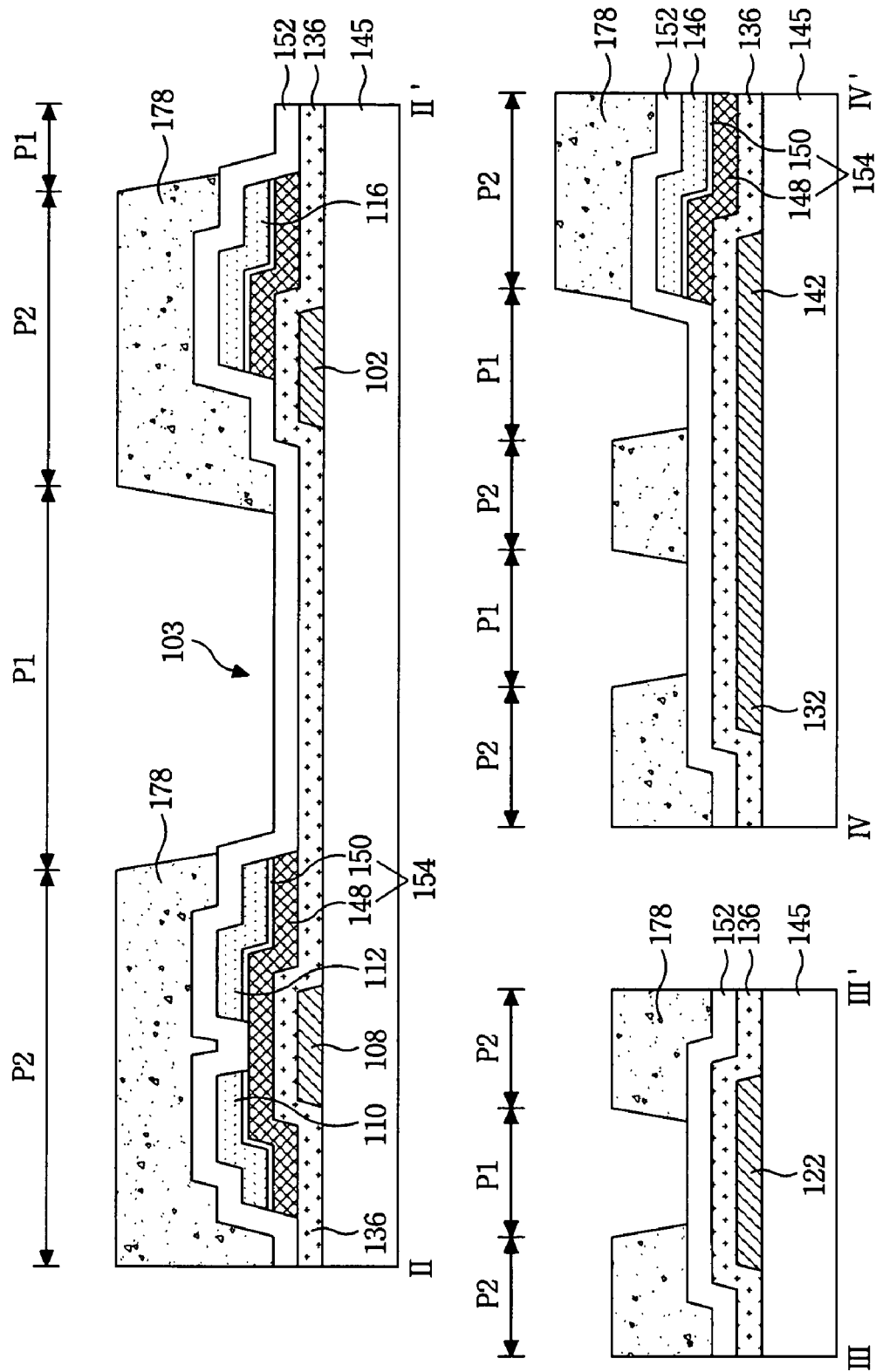

LIQUID CRYSTAL DISPLAY DEVICE AND FABRICATING METHOD THEREOF

This application claims the benefit of Korean Patent Application No. P05-0130755 filed in Korea on Dec. 27, 2005, which is hereby incorporated by reference in its entirety.

BACKGROUND OF THE INVENTION

1. Field of the Invention

Embodiments of the invention relate to a display device, and more particularly to a liquid crystal display device and a fabricating method thereof. Although embodiments of the invention are suitable for a wide scope of applications, it is particularly suitable for reducing the number of mask process and preventing an electric contact defect between a data pad and a data line.

2. Description of the Related Art

Generally, a liquid crystal display device controls light transmittance of liquid crystal molecules using an electric field, to thereby display a picture. More specifically, the electric field is provided between a pixel electrode and a common electrode arranged to be opposed to each other on upper and lower substrates of a liquid crystal display device. The lower and upper substrates are often respectively referred to as thin film transistor array substrate and color filter array substrate. A spacer maintains a cell gap, filled with liquid crystal molecules, between the two substrates. The thin film transistor array substrate includes a plurality of signal wirings, thin film transistors, and an alignment film coated thereon for aligning the liquid crystal molecules. The color filter array substrate includes a color filter for implementing a color, a black matrix for preventing light leakage, and an alignment film coated thereon for aligning the liquid crystal molecules.

Since the thin film transistor substrate in such a liquid crystal display device is fabricated by a semiconductor processing and requires a plurality of mask processes, the fabricating process is a major factor in the manufacturing cost of a liquid crystal display panel. For example, one mask process includes many processes, such as thin film deposition, cleaning, photolithography, etching, photo-resist stripping and inspection. To reduce complexity caused by many mask processes, manufacturers of liquid crystal display devices have put a lot of effort into researching manufacturing techniques that reduce the number of mask process. As a result, a thin film transistor substrate manufacturing process has been developed that reduces the number of mask process to three rounds.

FIG. 1 is a plan view showing a data pad portion of a thin film transistor array substrate using a related art three-round mask process, and FIG. 2 is a cross-sectional view of the data pad portion taken along line I-I' in FIG. 1. Referring to FIG. 1 and FIG. 2, the data pad portion includes a data pad 30, and a data link portion 40 extending from a data line 4 to connect to the data pad 30. The data pad 30 is connected to output pins of a data driving integrated circuit in a one-to-one relationship to supply a data signal of the data driving integrated circuit to the data line 4. Such a data pad 30 includes a lower data pad electrode 32 and an upper data pad electrode 34. Herein, the upper data pad electrode 34 is connected, via a first contact hole 33 passing through a gate insulating film 36 and a protective film 52, to the lower data pad electrode 32.

The data link portion 40 electrically connects the data pad 30 to the data line 4. To this end, the data link portion 40 includes a lower data link electrode 42, an upper data link electrode 46, a link electrode 44. Herein, the lower data link electrode 42 is connected to the lower data pad electrode 32. The upper data link electrode 46 is connected to the data line 4. The link electrode 44 connects the lower data link electrode 42 exposed via a second contact hole 43 to the upper data link electrode 46 exposed via a second contact hole 43. Herein, the second contact hole 43 is positioned at a center of the data link portion 40 and passes through the protective film 52, the upper data link electrode 46, a semiconductor layer 38, and the gate insulating film 36 to expose the lower data link electrode 42.

FIG. 3A to FIG. 3E are cross-sectional views showing a method of fabricating the thin film transistor array substrate in FIG. 2. Referring to FIG. 3A, a first mask process disposes a gate metal layer on a substrate 2, and then a photolithography process and an etching process using a first mask provide a gate metal pattern group, including the lower data pad electrode 32 and the lower data link electrode 42, are carried out.

Referring to FIG. 3B, an insulating film, a semiconductor material active layer, an ohmic contact material and a metal layer are provided on the gate metal pattern group, including the lower data pad electrode 32 and the lower data link electrode 42. A second mask process, including a photolithography process and an etching process, uses a second mask to provide the semiconductor layer 38, including an active layer and an ohmic contact layer, and a source/drain metal pattern group 46, including a data line, on the gate insulating film 36 are carried out.

Next, referring to FIG. 3C, a protective film 52 is formed over the semiconductor layer 38, including an active layer and an ohmic contact layer, and a source/drain metal pattern group 46, including a data line. A third mask process forms a photo-resist pattern 60 by exposure and development processes using a third mask, and then the first contact hole 33 passing through the protective film 52 and the gate insulating film 36 to the lower data pad electrode 32 is formed by an etching process using the photo-resist pattern 60 while the second contact hole 43 is formed passing through the protective film 52, the upper data link electrode 46, the semiconductor layer 38 and the gate insulating film 36 to the lower data link electrode 42. A transparent conductive film 44a is provided over the photo-resist pattern 60 and into the first and second contact holes 33 and 43.

As shown in FIG. 3D, the photo-resist pattern with the transparent conductive layer 44a thereon is removed with a stripper during a lift-off process to provide a transparent electrode pattern group, including the link electrode 44 and the upper data pad electrode 34.

As described above, in the data link portion 40, thin films, including the protective film 52, a source/drain metal layer, the semiconductor layer 38 and the gate insulating film 36, should be etched using the third mask process to expose the lower data link electrode 42 via the second contact hole 43. The etching time for the first contact hole 33 may need to be reduced to prevent over-etching of the lower data pad electrode 32 in the first contact hole 33 so that just the protective film and the gate insulating film 36 are etched. However, a problem may occur when reducing etching time to prevent over-etching in that the gate insulating film 36 in the second contact hole 43 may not be entirely etched away, as shown in FIG. 3E. Thus, leaving leftover gate insulating film 36 on the lower data link electrode 42. Accordingly, the gate insulating film 36 is left between the lower data link electrode 42 and the upper data link electrode 46 to generate an electric contact defect between the lower data link electrode 42 and link electrode 44. As a result, a data signal of the data driving integrated circuit can not be supplied to the data line 4.

SUMMARY OF THE INVENTION

Accordingly, embodiments of the invention are directed to a liquid crystal display device and a fabricating method thereof that substantially obviates one or more of the problems due to limitations and disadvantages of the related art.

An object of embodiments of the invention to provide a liquid crystal display device and a fabricating method thereof having a reduced number of mask processes.

Another object of embodiments of the invention to provide a liquid crystal display device and a fabricating method that prevents an electric contact defect between a data pad and a data line.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other objects of the invention, a thin film transistor array substrate includes a gate line on a substrate, a data line crossing the gate line to define a pixel area, a gate insulating film between the gate line and the data line at the crossing of the gate line and data line, a thin film transistor adjacent to the crossing of the gate line and the data line, a protective film covering the thin film transistor, a pixel electrode provided on the pixel area and electrically connected to a drain electrode of the thin film transistor, a gate pad connected to the gate line, a data pad connected to the data line, a lower data link electrode connected to the data line, an upper data link electrode connected to the data line and overlapping one end of the lower data link electrode, and a link electrode connecting the lower data link electrode via a first contact hole passing through the protective film and the gate insulating film at a first area of the substrate in which the protective film is directly provided on the gate insulating film.

In another aspect, a method of fabricating a thin film transistor array substrate includes forming a gate line, and a gate pad connected to the gate line on a substrate, forming a gate insulating film on the gate line, forming a data line crossing the gate line to define a pixel area, and a data pad connected to the data line, forming a protective film covering a thin film transistor provided at a crossing of the gate line and the data line, forming a pixel electrode provided on the pixel area, and electrically connected to a drain electrode of the thin film transistor, forming a lower data link electrode connected to the data line, forming an upper data link electrode connected to the data line and overlapping one end of the lower data link electrode, and forming a link electrode connecting the lower data link electrode via a first contact hole passing through the protective film and the gate insulating film at a first area in which the protective film is directly provided on the gate insulating film.

In another aspect, a method of fabricating a thin film transistor array substrate includes forming a first mask pattern group having a gate line, a gate electrode connected to a gate line and a lower gate pad electrode, a lower data pad electrode to be connected to a data line, and a lower data link electrode connected to a lower data pad electrode on a substrate, forming a second mask pattern group having a gate insulating film over the first mask pattern group, a semiconductor layer formed on a gate insulating film, a data line provided on a semiconductor layer and crossing the gate line to define a pixel area, a source electrode of a thin film transistor connected to a data line, a drain electrode opposed to a source electrode, and an upper data link electrode connected to a data line and provided to overlap one end of a lower data link electrode, and forming a third mask pattern group including a protective film formed to cover a second mask pattern group, a pixel electrode connected to a drain electrode using a lift-off process, and a link electrode connecting a lower data link electrode exposed via a first contact hole passing through a protective film and a gate insulating film at a first area of the substrate in which the protective film is directly provided on the gate insulating film.

In another aspect, a thin film transistor array substrate includes a gate line provided on a substrate, a data line crossing the gate line to define a pixel area, a gate insulating film between the gate line and the data line at the crossing of the gate line and data line, a protective film directly provided on the gate insulating film at first, second and third areas of the substrate, a gate pad connected to the gate line, a data pad connected to the data line, a lower data link electrode connected to the data line, an upper data link electrode connected to the data line and overlapping one end of the lower data link electrode, a link electrode connecting the lower data link electrode via a first contact hole passing through the protective film and the gate insulating film at the first area, a lower data pad electrode extending from the lower data link electrode, an upper data pad electrode connected to the lower data pad electrode via a second contact hole passing through the gate insulating film and the protective film at the second area, a lower gate pad electrode extending from the gate line, and an upper gate pad electrode connected via a third contact hole passing through the gate insulating film and the protective film to the lower gate pad electrode at the third area.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings:

FIG. 8A to FIG. 8C are cross-sectional views for specifically explaining a second mask process in a method of fabricating the thin film transistor array substrate according to an embodiment of the invention, respectively.

DETAILED DESCRIPTION OF THE PREFERRED EMBODIMENTS

Figure 1:
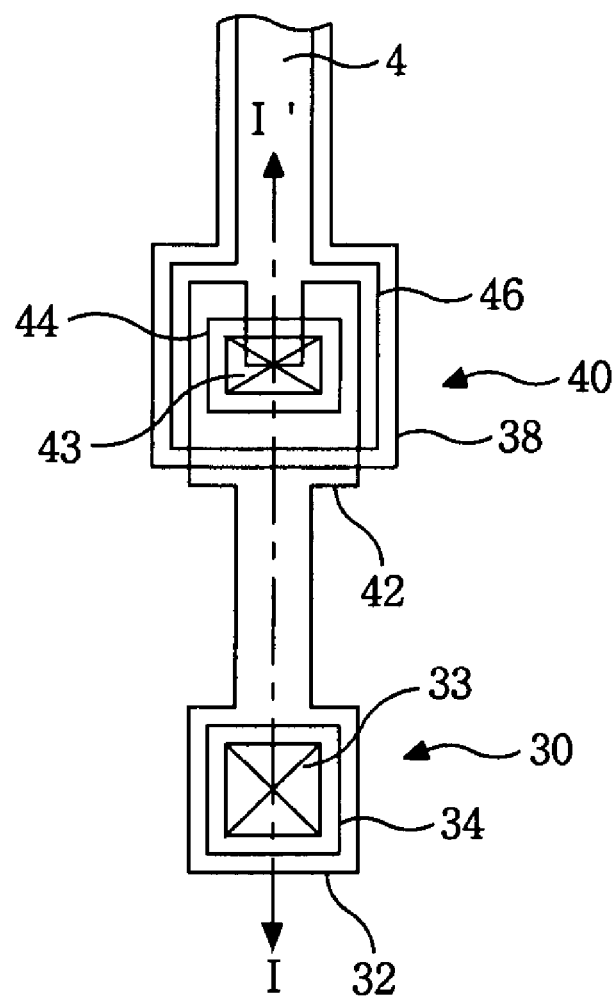
FIG. 1 is a plan view showing a data pad portion of the related art thin film transistor array substrate.
Figure 2:
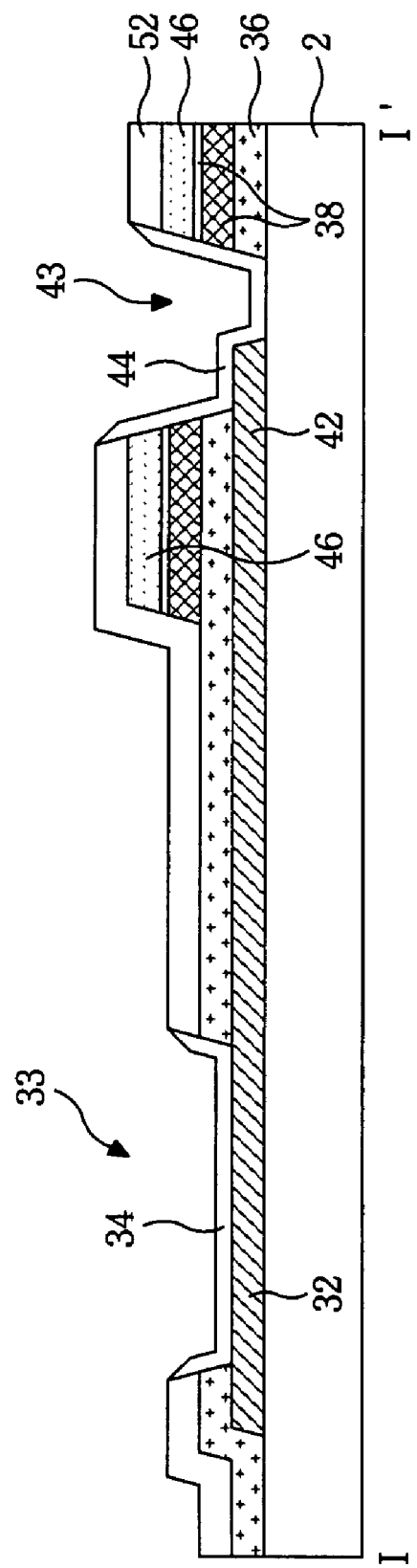
FIG. 2 is a cross-sectional view of the data pad portion taken along line I-I' in FIG. 1.
Figure 3A:
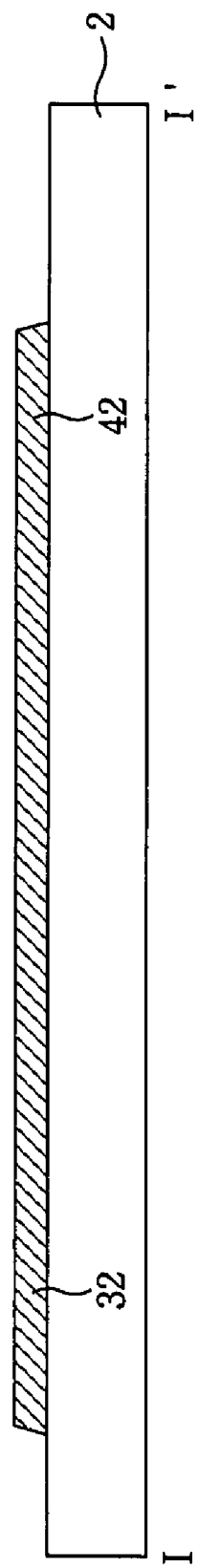
FIG. 3A to FIG. 3E are cross-sectional views showing a method of fabricating the thin film transistor array substrate in FIG. 2.
Figure 3B:
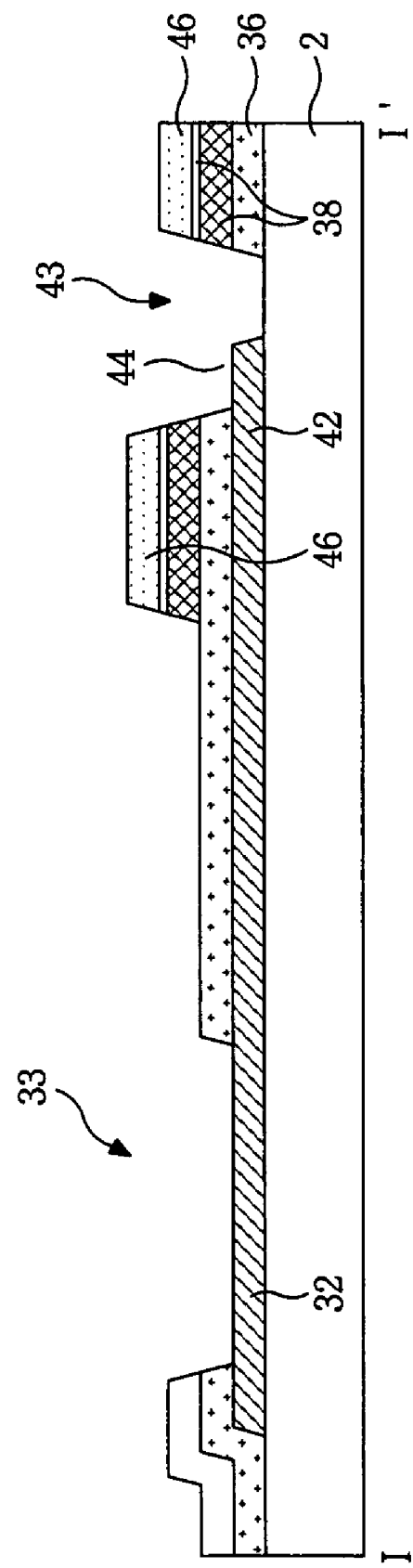
Figure 3C:
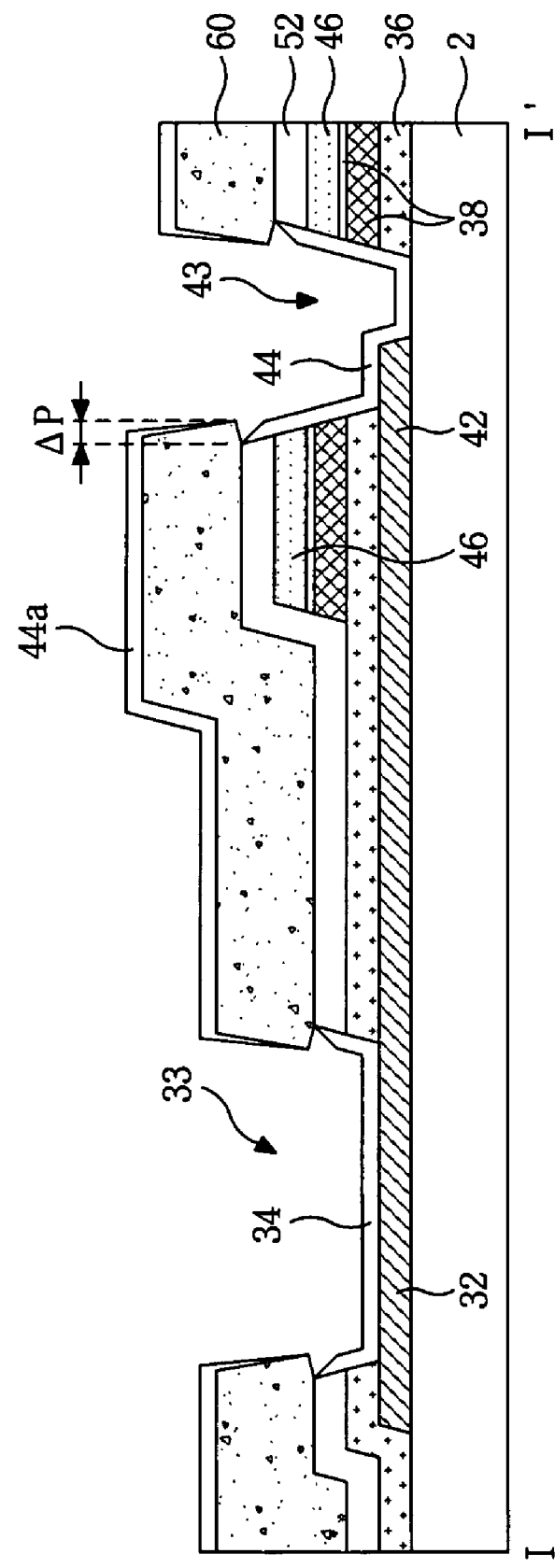
Figure 3D:
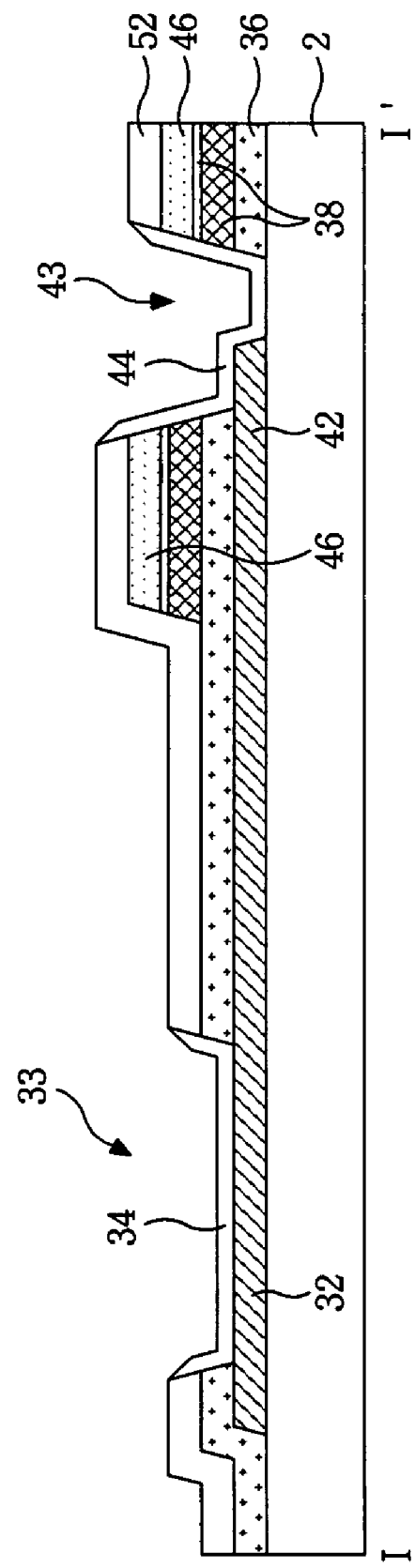
Figure 3E:
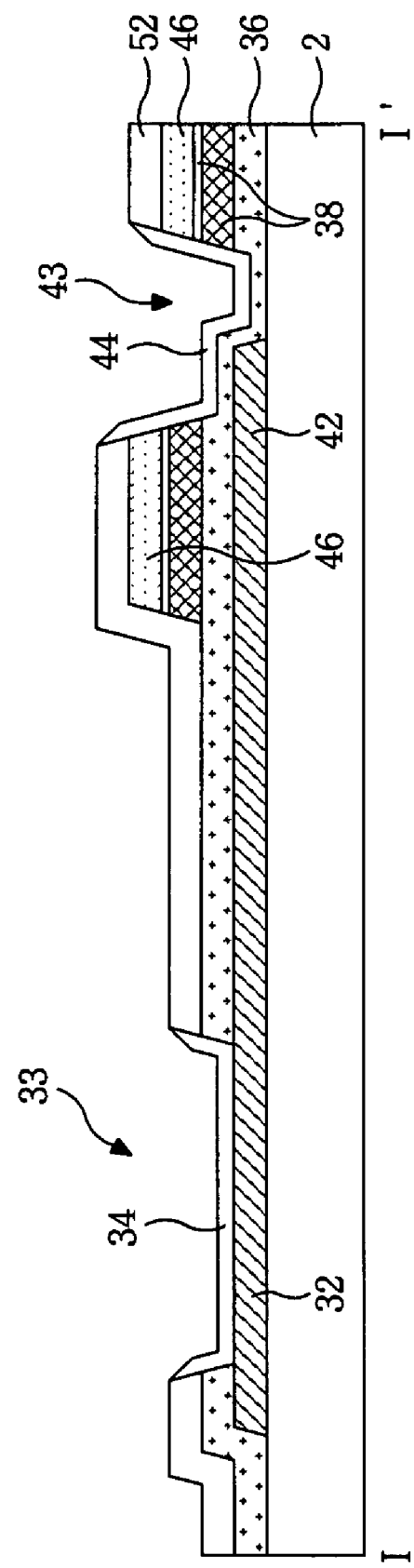

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 4:
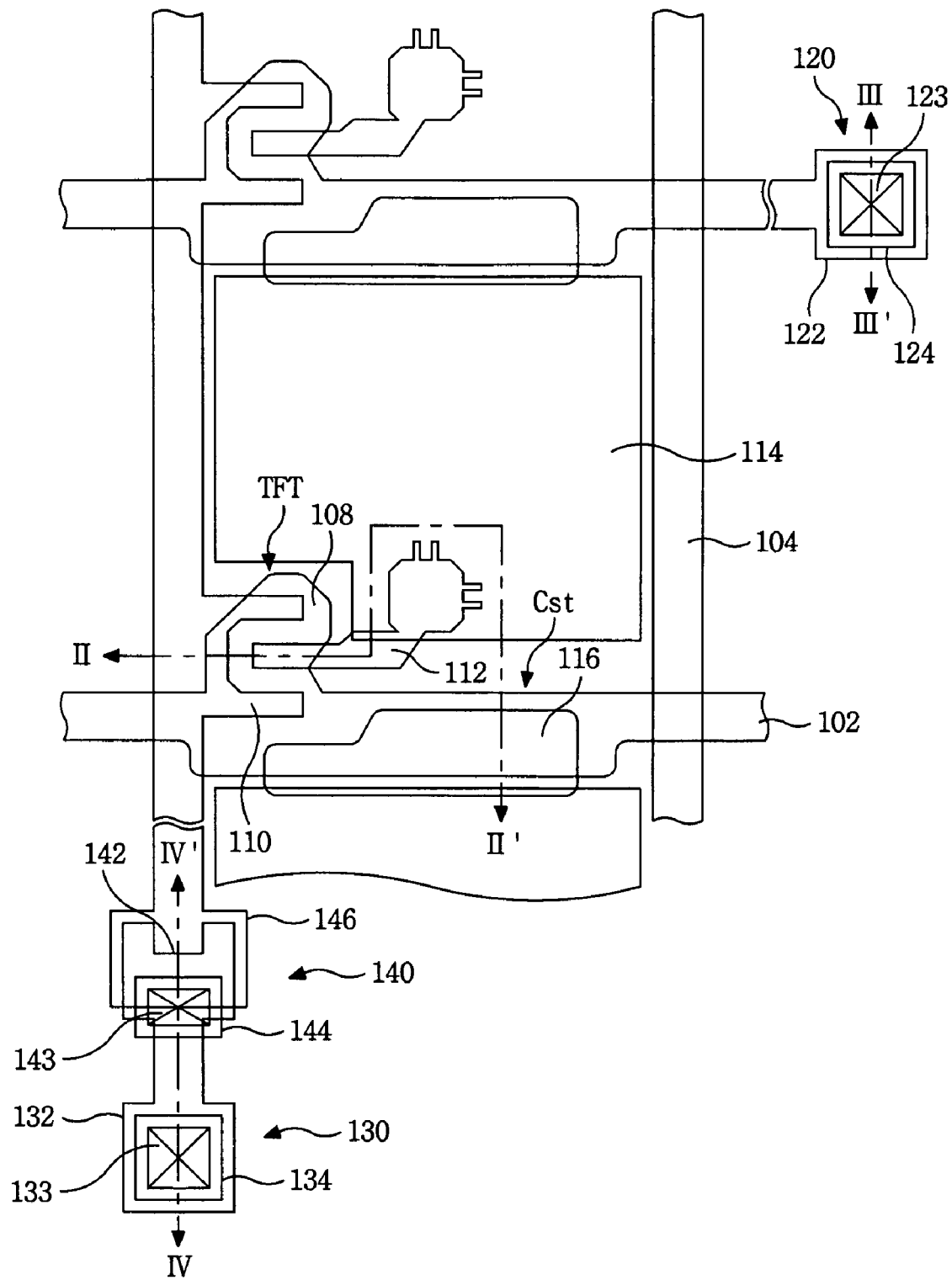
FIG. 4 is a plan view showing a thin film transistor array substrate according to an embodiment of the invention.
Figure 5:
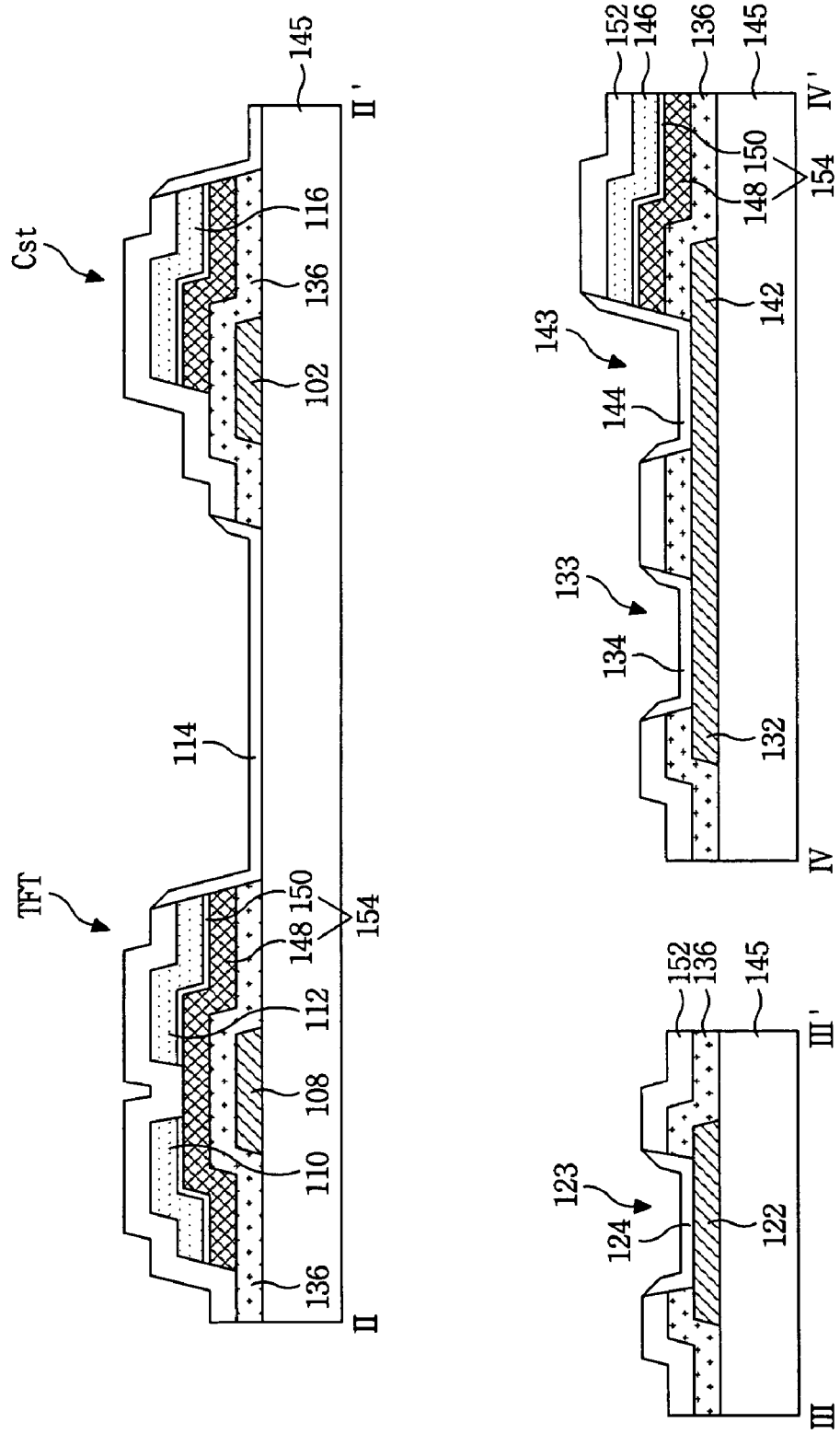
FIG. 5 are cross-sectional views of the thin film transistor array substrate taken along lines II-II', III-III' and IV-IV' in FIG. 4.

FIG. 4 is a plan view showing a thin film transistor array substrate a liquid crystal display device according to an embodiment of the invention, and FIG. 5 are cross-sectional views of the thin film transistor array substrate taken along lines II-II', III-III' and IV-IV' in FIG. 4. Referring to FIG. 4 and FIG. 5, the thin film transistor array substrate includes gate lines 102 and data lines 104 provided on a lower substrate 145 that cross each other with a gate insulating film 136 therebetween to define pixel areas, a thin film transistor TFT provided at each crossing of the gate lines 102 and the data lines 104, a pixel electrode 114 is provided in each pixel area, a storage capacitor Cst for each pixel area is provided at an overlapped portion between a storage electrode 116 and a pre-stage gate line 102, a gate pad extended from the gate line 102, a data pad 130 extended from the data line 104, and a data link portion 140 linking between the data line and the data pad 130. The gate line 102 is supplied with a gate signal (or a scanning signal), and the data line 104 is supplied with a data signal.

The TFT forms a channel to supply a pixel signal of the data line 104 to the pixel electrode 114 in response to a scanning signal. More specifically, a channel allows current to flow between the source electrode 110 and the drain electrode 112. To this end, the TFT includes a gate electrode 108 connected to the gate line 102, a source electrode 110 connected to the data line 104, a drain electrode 112 connected to the pixel electrode 114, and a semiconductor layer 154 overlapping the gate electrode 108 with having a gate insulating film 136 therebetween. The semiconductor layer 154 includes an active layer 148 forming a channel between the source electrode 110 and the drain electrode 112, and ohmic contact layers 150 formed on the active layer 148 other than a channel portion for making an ohmic contact with the source and drain electrodes 110 and 112. The pixel electrode 114 is made from a transparent electrode within a pixel area defined by the data line 104 and the gate line 102, and is directly connected to the drain electrode 112 of the TFT.

An electric field is formed between the pixel electrode supplied with a pixel signal via the TFT and a common electrode supplied with a common voltage. Liquid crystal molecules arranged between the thin film transistor array substrate and the color filter array substrate are rotated by such an electric field due to their dielectric anisotropy. Transmittance of a light through the pixel area is differentiated depending upon a rotation extent of the liquid crystal molecules to implement a gray level scale.

The storage capacitor Cst is formed between the pre-stage gate line 102 and the storage electrode 116, which are overlapping and have both the gate insulating film 136 and the semiconductor layer 154 therebetween. Thus, the storage capacitor Cst allows a pixel signal charged in the pixel electrode 114 to be stably maintained until the next signal is charged. The storage electrode 116 is directly connected to the pixel electrode 114.

The gate pad 120 is connected to output pins of a gate driving integrated circuit in a one-to-one relationship to supply a gate signal generated by the gate driving integrated circuit to the gate line 102. Such a gate pad 120 includes a lower gate pad electrode 122 extended from the gate line 102, and an upper gate pad electrode 124 connected to the lower gate pad electrode 122 via a first contact hole 123 passing through the gate insulating film 136 and the protective film 152.

The data pad 130 is connected to output pins of a data driving integrated circuit one-to-one relationship to supply a data signal generated by the data driving integrated circuit to the data line 104. Such a data pad 130 includes a lower data pad electrode 132 extended from the data line 104, and an upper data pad electrode 134 connected to the lower data pad electrode 132 via a second contact hole 133 passing through the gate insulating film 136 and the protective film 152.

The data link portion 140 is formed between the data pad 130 and the data line 104 to electrically connect the data pad 130 to the data line 104. To this end, the data link portion 140 includes a lower data link electrode 142, an upper data link electrode 146, and a link electrode 144. In this case, the lower data link electrode 142 is connected to the lower data pad electrode 132, the upper data link electrode 146 is connected to the data line 104, and the link electrode 144 connects the lower data link electrode 142 exposed via a third contact hole 143 to the upper data link electrode 146. Herein, the third contact hole 143 is formed at an end of the upper data link electrode 146 adjacent to the data pad 130. As described above, the gate insulating film 136 and the protective film 152 are only etched to form the third contact hole 143, which exposes the lower data link electrode 142 when the third contact hole 143 is formed at an end of the upper data link electrode 146. Accordingly, the lower data link electrode 142 is exposed through the gate insulating film 136 and the protective film 152 via the third contact hole 143 just like the lower data pad electrode 132 is exposed through the gate insulating film 136 and the protective film 152 via the second contact hole 123. As a result, embodiments of the invention do not have any leftover gate insulating film 136 in the third contact hole, since both the second and third contact holes 133 and 143 are etched through the same number of layers.

Figure 6A:
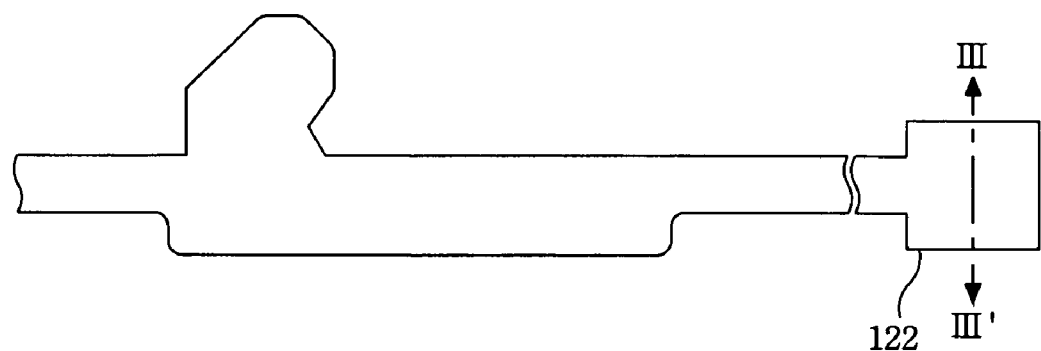
FIG. 6A and FIG. 6B are a plan view and a cross-sectional view for explaining a first mask process in a method of fabricating the thin film transistor array substrate according to an embodiment of the invention, respectively.
Figure 6A:
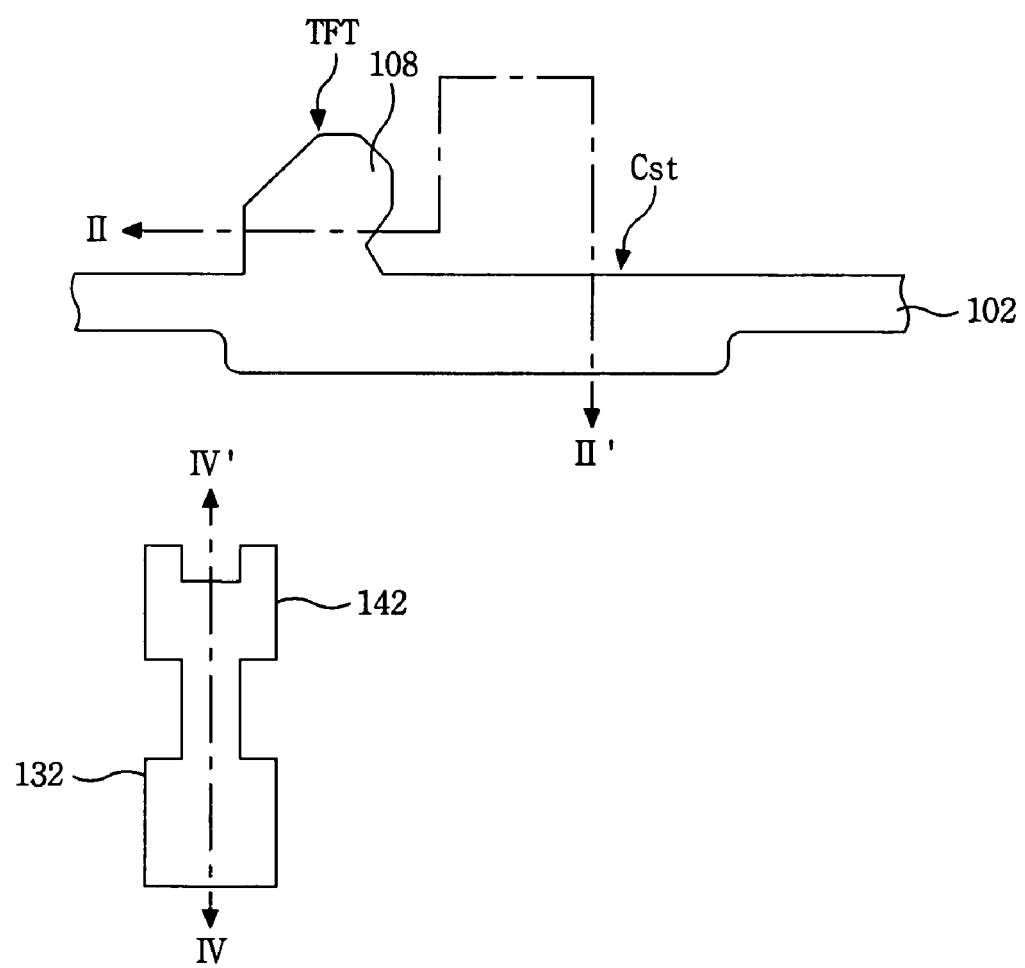
Figure 6B:
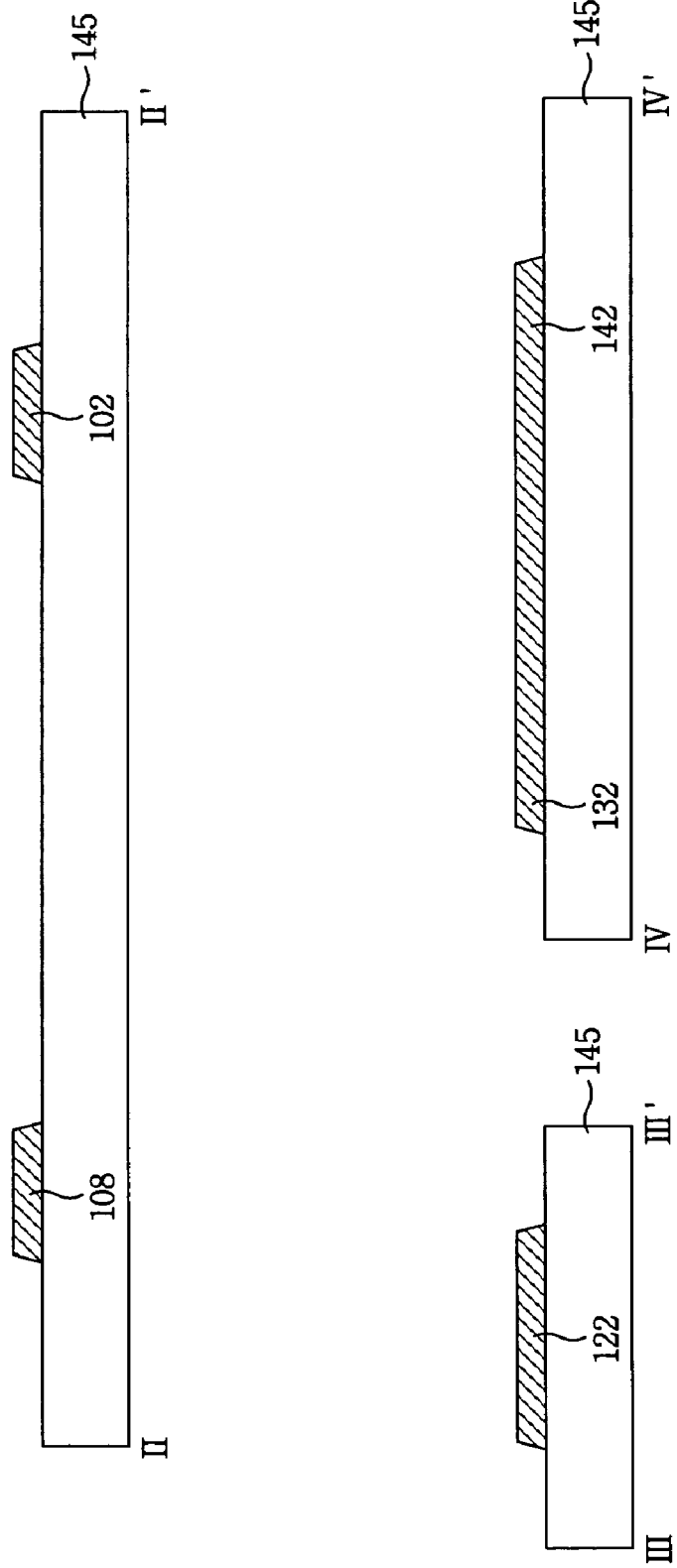

The thin film transistor substrate according to the embodiments of the invention, as described above, can be manufactured by a three-round mask process. FIG. 6A and FIG. 6B are a plan view and a cross-sectional view for explaining a first mask process in a method of fabricating the thin film transistor array substrate according to an embodiment of the invention, respectively. Referring to FIG. 6A to FIG. 6B, a gate metal pattern group is formed on the lower substrate 145 by the first mask process. Herein, the gate metal pattern group includes the gate line 102, the gate electrode 108, the lower gate pad electrode 122, the lower data pad electrode 132, the lower data link electrode 142.

The gate metal layer can be formed on the lower substrate 145 by a deposition technique, such as sputtering. The gate metal layer employs a single layer made from a metallic material, such as Mo, Ti, Cu, AlNd, Al, Cr, a Mo-alloy, a Cu-alloy or an Al-alloy, or can be made of a overlapping structure of at least double layers, such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/

Al, Al-alloy/Mo-alloy, Mo-alloy/Al, and Mo/Al-alloy. Next, the gate metal layer is patterned by a photolithography process and an etching process using a first mask to provide the lower data pad electrode 132, the lower data link electrode 142 and the gate metal pattern group, including the gate line 102, the gate electrode 108, and the lower gate pad electrode 122.

Figure 7A:
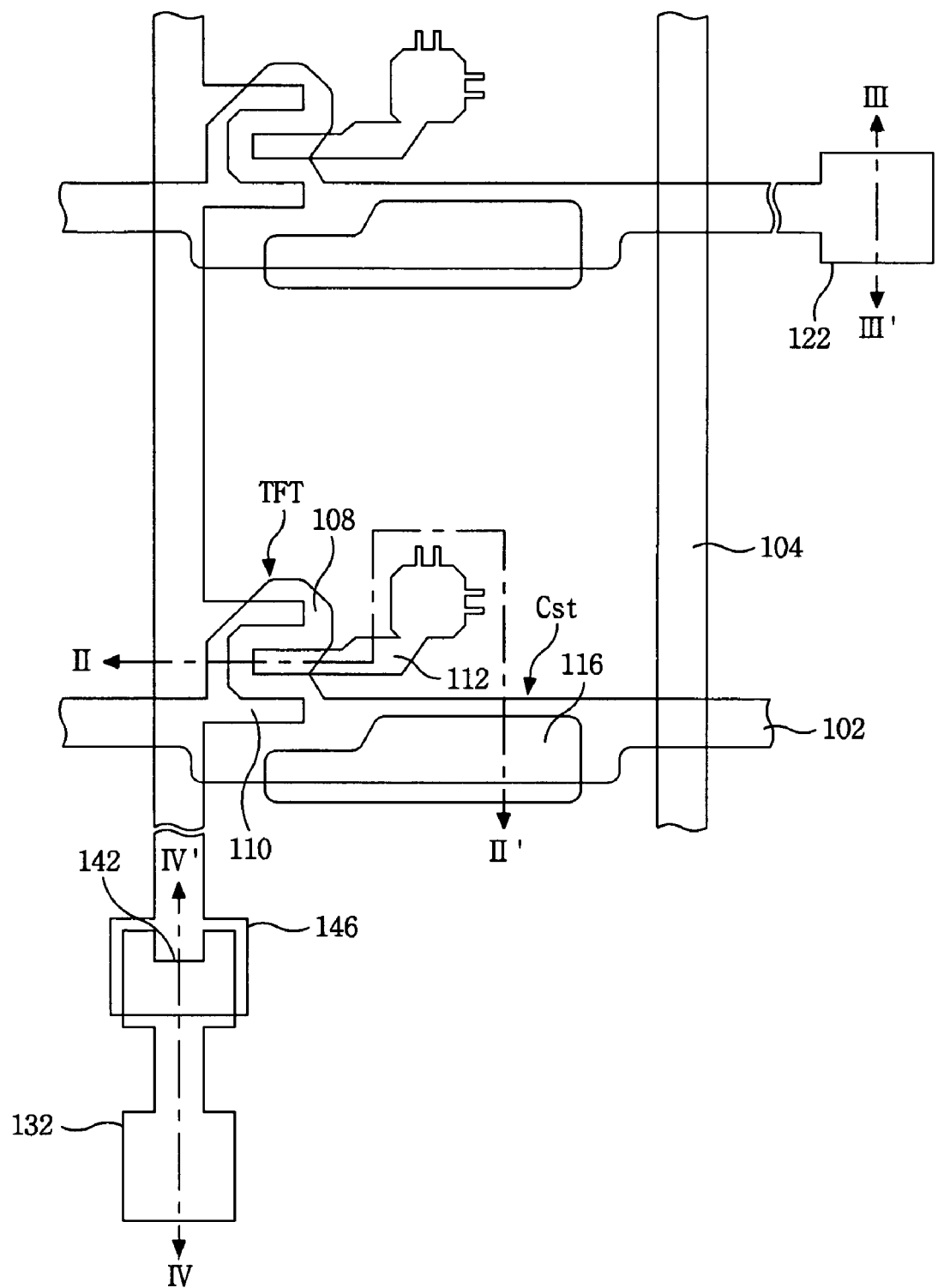
FIG. 7A and FIG. 7B are a plan view and a cross-sectional view for explaining a second mask process in a method of fabricating the thin film transistor array substrate according to an embodiment of the invention, respectively.
Figure 7B:
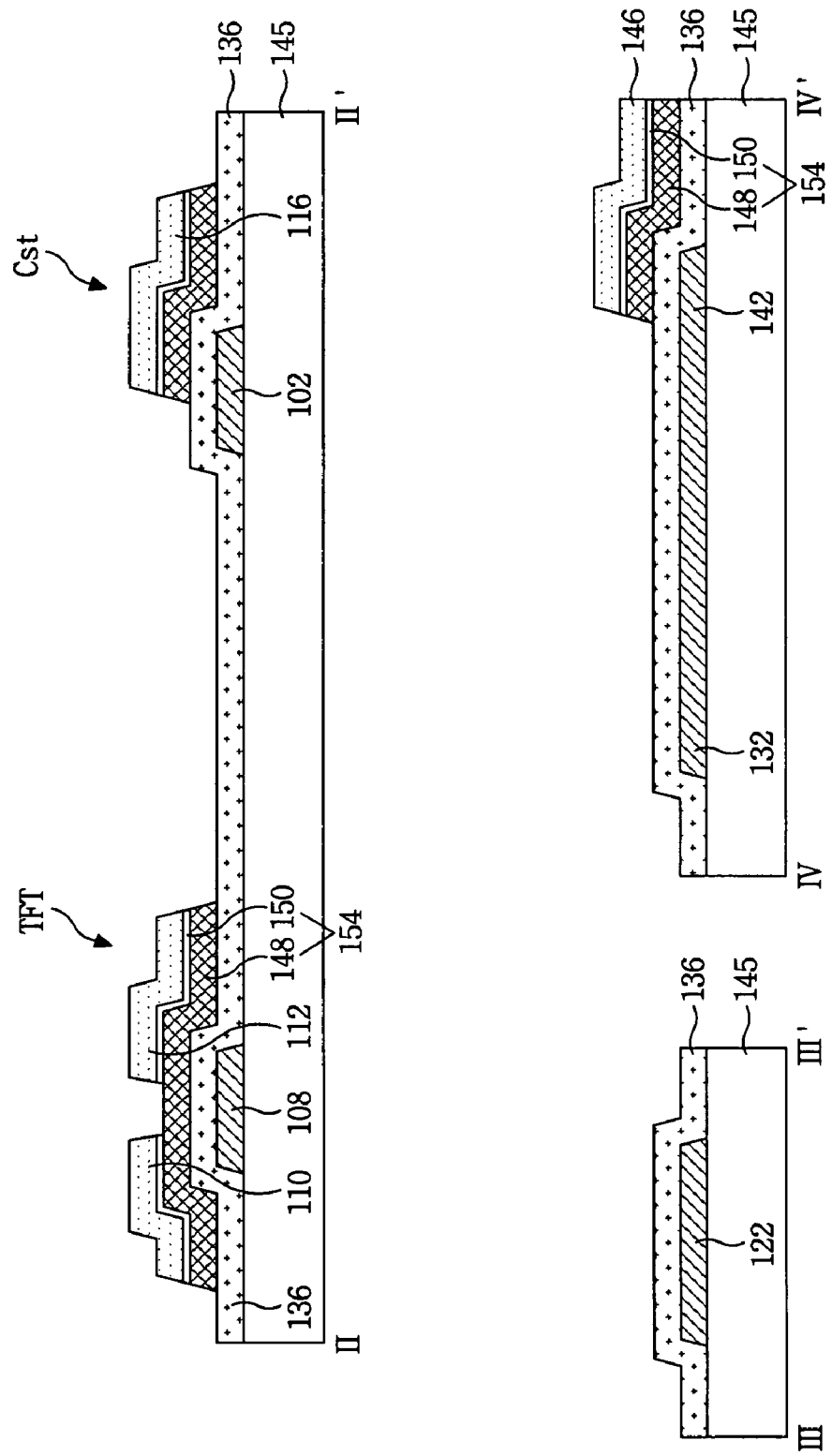

FIG. 7A and FIG. 7B are a plan view and a cross-sectional view for explaining a second mask process in a method of fabricating the thin film transistor array substrate according to an embodiment of the invention, respectively. A gate insulating film is formed on the lower substrate 145 provided with the gate metal pattern group by a deposition technique, such as plasma enhanced chemical vapor deposition (PECVD) or sputtering. The gate insulating film 136 is formed from an inorganic insulating material, such as silicon oxide ($SiO_x$) or silicon nitride ($SiN_x$). Next, a semiconductor layer 154 and a source/drain metal pattern are formed on the gate insulating film 136 by the second mask process. Herein, the semiconductor layer 154 includes the active layer 148 and the ohmic contact layer 150 disposed on the gate insulating film, the source/drain metal pattern includes the data line 104, the drain electrode 112, the upper data link electrode 146, and the storage electrode 116.

Figure 8B:
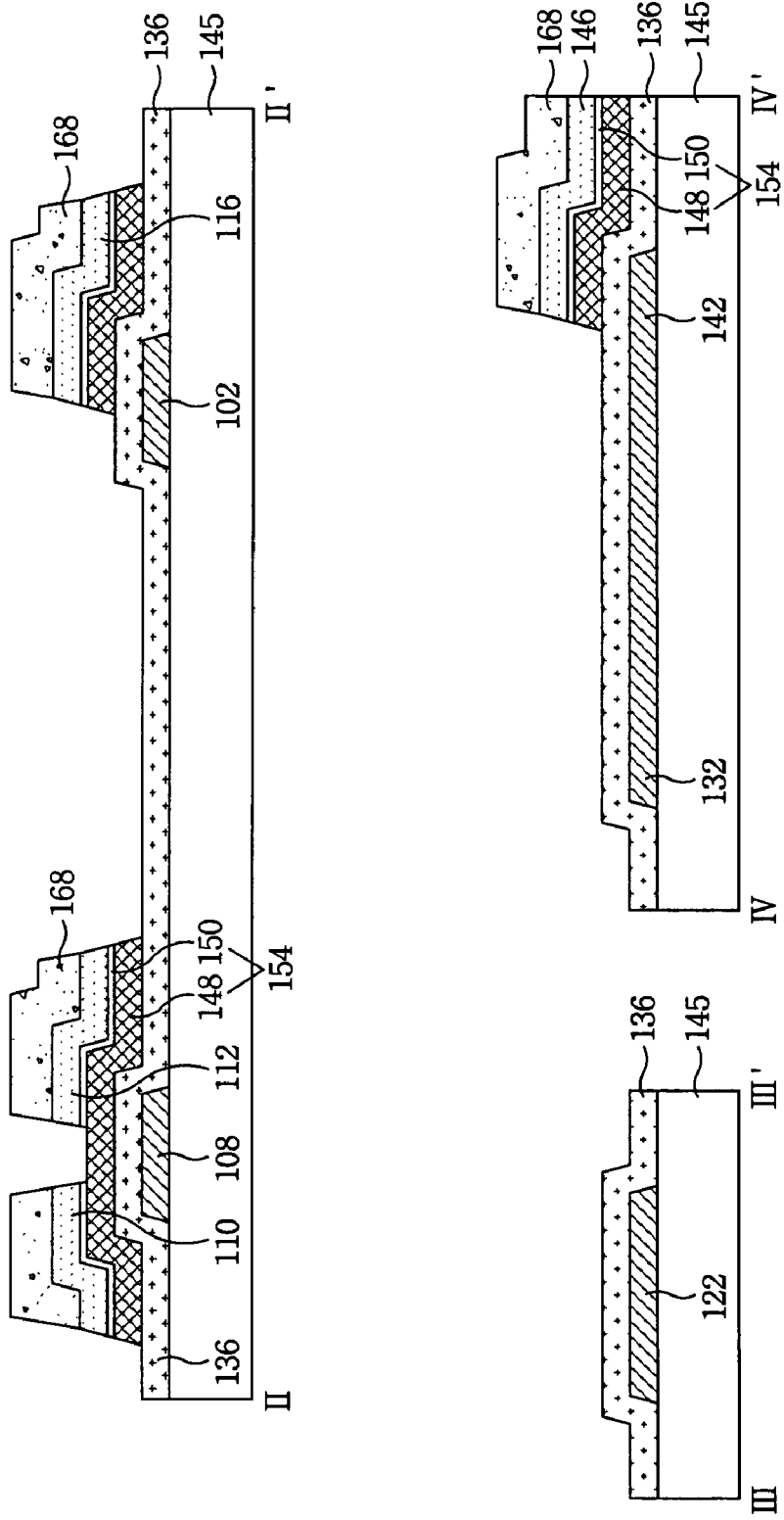
Figure 8C:
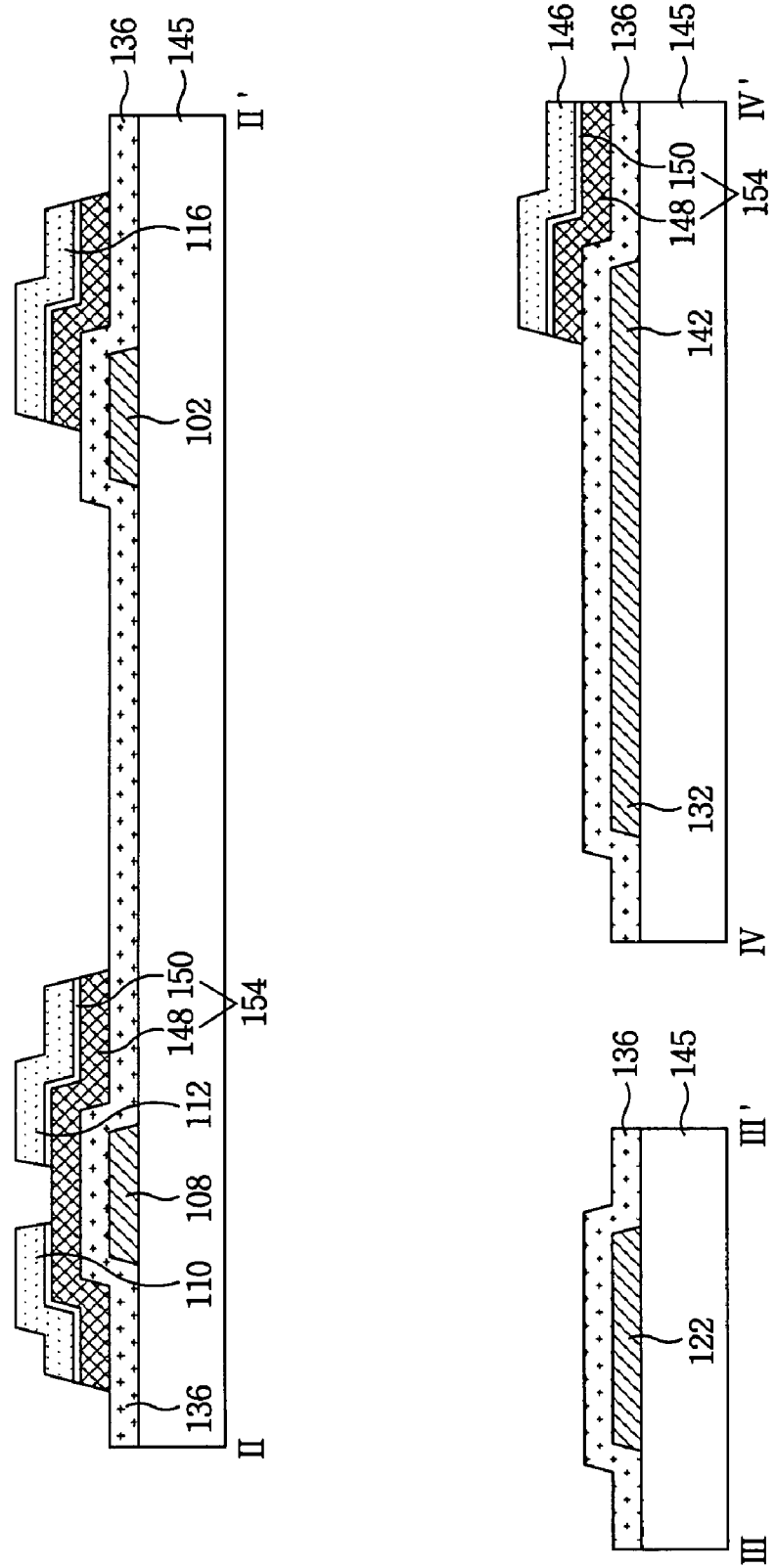

FIG. 8A to FIG. 8C are cross-sectional views for specifically explaining a second mask process in a method of fabricating the thin film transistor array substrate according to an embodiment of the invention, respectively. Referring to FIG. 8A, a first semiconductor layer 148A, a second semiconductor layer 150A, and a source/drain metal layer 104A are sequentially formed on the gate insulating film 136 by the deposition technique, such as PECVD or sputtering. Herein, the first semiconductor layer 148A is made from an undoped amorphous silicon, and the second semiconductor layer 150A is made from an amorphous silicon doped with a N-type or a P-type impurities. The source/drain metal layer 104A is made from a metal, such as Mo or Cu.

Next, a photo-resist film is formed on the source/drain metal layer 104A, and then a second mask is aligned at an upper portion of the lower substrate 145. Herein, the second mask partially diversifies incident light. The second mask is a diffraction mask or a half-tone mask, and includes an exposure area P1 that fully transmits incident light, a shielding area P2 the shields incident light, and a partial exposure area P3 that partially transmits incident light. The photo-resist film is exposed and developed by the second mask to provide a photo-resist pattern 168 having step coverage at the shielding area P2, and at the partial exposure area P3 of the second mask. In other words, the photo-resist pattern 168 provided at the partial exposure area P3 has a height lower than the photo-resist pattern 168 provided at the shielding area P2.

Referring to FIG. 8B, the source/drain metal layer 154 is patterned by a wet-etching process using the photo-resist pattern 168 as a mask to provide a source/drain metal pattern group, including the data line 104, the source electrode 110, the drain electrode 112, the upper data link electrode 146, and the storage electrode 116 in the second mask process. Further, the first semiconductor layer 148A and the second semiconductor layer 150A are etched by a dry-etching process using the photo-resist pattern 168 as a mask to provide the active layer 148 and the ohmic contact layer 150 along with the source/drain metal pattern. Next, the second mask process carries out an ashing process using $O_2$ plasma to entirely remove the photo-resist pattern 168 having a second height at the partial exposure area P3, and to lower a height of the photo-resist pattern 168 having a first height h1 at the shielding area P2. The source/drain metal layer 104A and the ohmic contact layer 150 are removed by an etching process using the photo-resist pattern 168 left after the ashing process to separate the drain electrode 112 and the source electrode 110. Herein, the source/drain metal layer 104A and the ohmic contact layer 150 are formed at a channel portion of the thin film transistor.

Figure 9B:
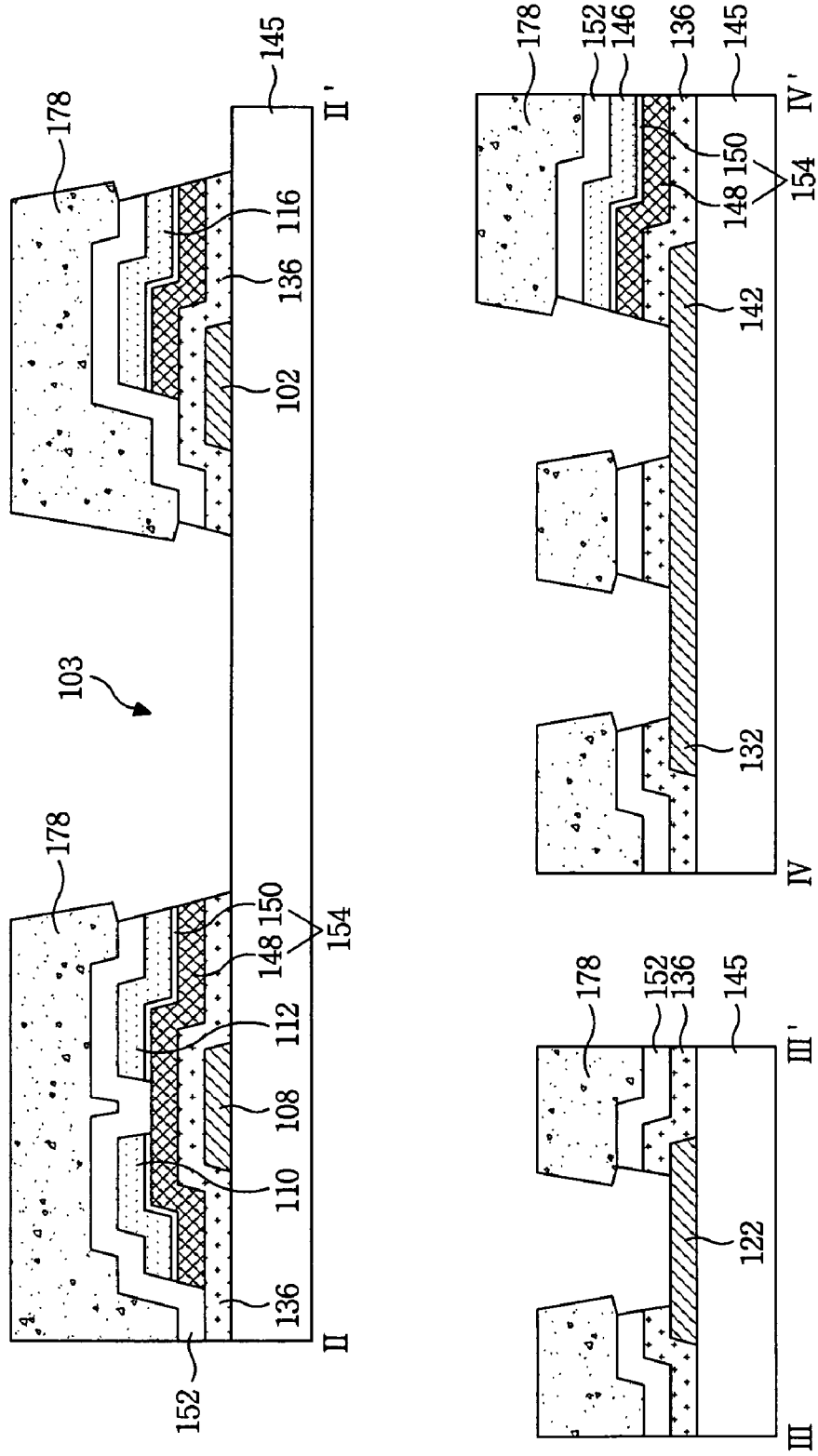
FIG. 9A and FIG. 9C are cross-sectional views for specifically explaining a third mask process in a method of fabricating the thin film transistor array substrate according to an embodiment of the invention, respectively.

The photo-resist pattern 168 left on the source/drain metal pattern is removed by a stripping process. In reference to FIG. 9A to FIG. 9C, the third mask process will be described for forming a third mask pattern group, including the protective film 152, the pixel electrode 114, the upper gate pad electrode 124, the upper data pad electrode 134, and the data pad link electrode 144. First, the protective film 152 is formed over the semiconductor pattern, the source/drain metal pattern, and the gate insulating film 143, as shown in FIG. 9A. The protective film 152 is made from an inorganic insulating material identical to the gate insulating film 136, or an organic insulating material, such as an acrylic organic compound having a small dielectric constant, such as BCB (Benzocyclobutane) or PFCB (Perfluorocyclobutane).

Next, the photo-resist film is formed over the protective film 152, and then the third mask is aligned over the substrate 145. The third mask includes the exposure area P1 for transmitting a light and a shielding area P2 for shielding a light. The third mask process exposes and develops the photo-resist film using the third mask to provide a photo-resist pattern 178 at the shielding area P2 of the third mask. A pixel hole 103, the first contact hole 123, the second contact hole 133, and the third contact hole 143 are formed by an etching process using the photo-resist pattern 178, as shown in FIG. 9B. Herein, the pixel hole 103 passes through the gate insulating film 136 and the protective film 152 directly provided on the gate insulating film 136 to expose the substrate 145 in the pixel area. The first contact hole 123 passes through the gate insulating film 136 and the protective film 152 directly provided on the gate insulating film 136 to expose the lower gate pad electrode 122. The second contact hole 133 passes through the gate insulating film 136 and the protective film 152 directly provided on the gate insulating film 136 to expose the lower data pad electrode 132. The third contact hole 143 passes through the gate insulating film 136 and the protective film 152 directly provided on the gate insulating film 136 to expose the lower data link electrode 142.

Figure 9C:
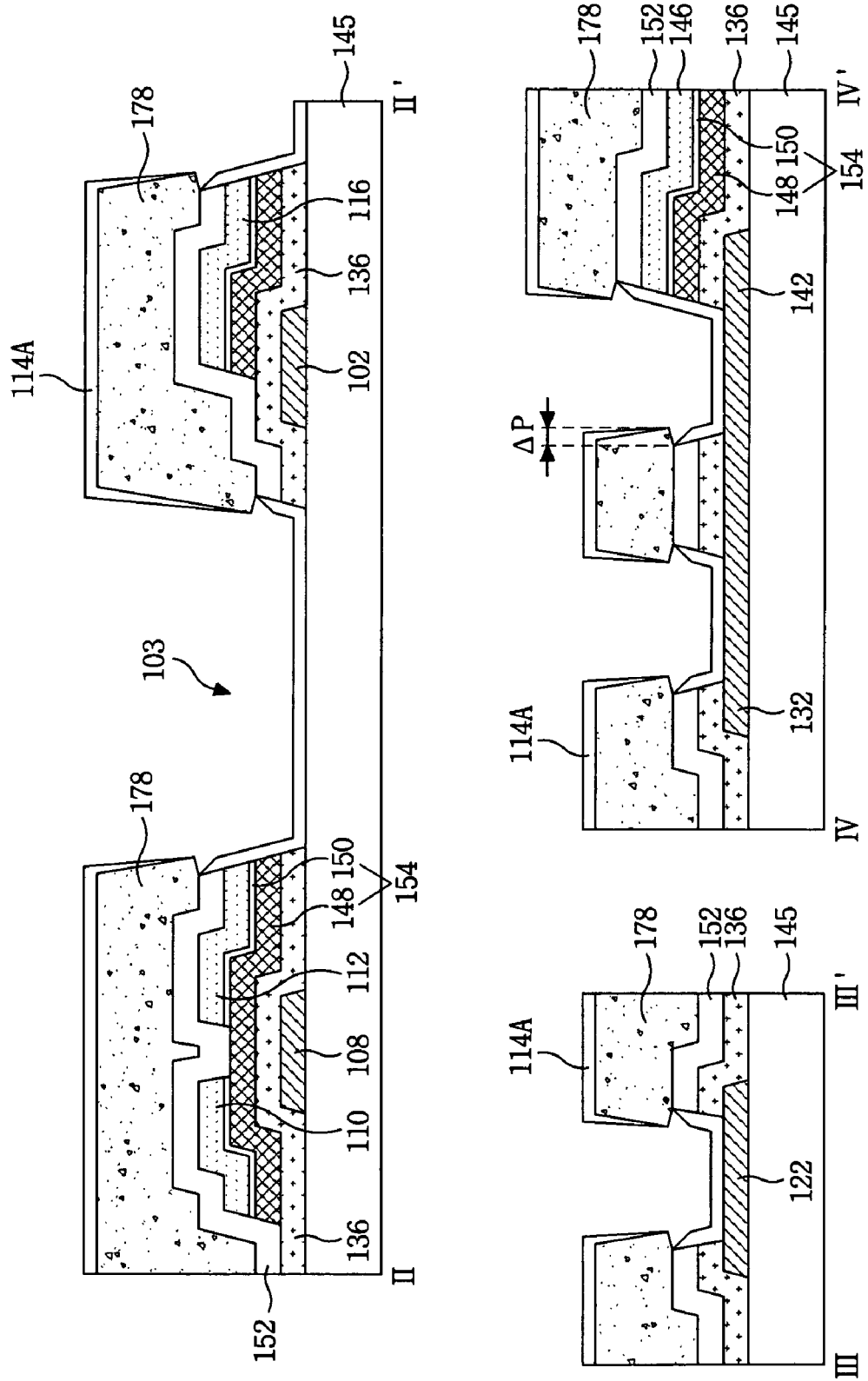

Next, the third mask process forms a transparent conductive film 114A over the substrate 145 having the first to third contact holes 123, 133, and 143, as shown in FIG. 9C. The transparent conductive film 114A is made from any one of indium tin oxide (ITO), tin oxide (TO), indium tin zinc oxide (ITZO), and indium zinc oxide (IZO). Next, the third mask process removes the photo-resist pattern 178, and a transparent conductive film 114A formed thereon in a lift-off process to provide the pixel electrode 114 in the pixel hole 103, the upper gate pad electrode 124 in the first contact hole 123, the upper data pad electrode 134 in the second contact hole 133, and the data pad link electrode 144 in the third contact hole 143, respectively, as shown in FIG. 5. On the other hand, an edge of the protective film 152 is over-etched inwardly as much as Δp from an edge of the photo-resist pattern 178 in order to carry out the lift-off process.

As described above, the liquid crystal display device and the fabricating method thereof according to the invention can fabricate the thin film transistor array substrate using only three-round mask process, so that it becomes possible to reduce the number of mask process. Embodiments of the invention form a contact hole at an end of the upper data link electrode in the data link portion to etch only the gate insulating film and the protective film directly provided on the gate insulating film when the contact hole is formed. Furthermore, the embodiments of the invention can prevent a phenomenon in which a leftover gate insulating film is generated that creates a contact defect between the lower data link electrode and the upper data link electrode. Also, the liquid crystal display device and the fabricating method thereof according to the invention forms the contact hole at an end of the upper data link electrode in the data link portion after entirely removing the gate insulating film in the contact hole. As a result, the invention electrically contact between the lower data link electrode and the upper data link electrode can be reliably made. Moreover, the liquid crystal display device and the fabricating method thereof according to the invention can be adapted to a data link portion of a thin film transistor array substrate having no protective film and just a gate insulating film through which the contact is formed.

It will be apparent to those skilled in the art that various modifications and variations can be made in the liquid crystal display device and a fabricating method thereof of embodiments of the invention without departing from the spirit or scope of the invention. Thus, it is intended that embodiments of the invention cover the modifications and variations of this invention provided they come within the scope of the appended claims and their equivalents.

What is claimed is:

1. A thin film transistor array substrate, comprising:
   a gate line provided on a substrate;
   a data line crossing the gate line to define a pixel area;
   a gate insulating film between the gate line and the data line at the crossing of the gate line and data line;
   a thin film transistor adjacent to the crossing of the gate line and the data line;
   a protective film covering the thin film transistor;
   a pixel electrode provided on the pixel area and electrically connected to a drain electrode of the thin film transistor;
   a gate pad connected to the gate line;
   a data pad connected to the data line;
   a lower data link electrode connected to the data line;
   an upper data link electrode connected to the data line and overlapping one end of the lower data link electrode; and
   a link electrode connecting the lower data link electrode via a first contact hole passing through the protective film and the gate insulating film at a first area of the substrate in which the protective film is directly provided on the gate insulating film,
   wherein the lower surface of the link electrode is connected on the upper surface of the lower data link electrode,
   wherein the gate insulating film and a semiconductor layer formed between the upper data link electrode and the lower data link electrode,
   wherein the first contact hole is formed at an end of the upper data link electrode adjacent to the data pad.

2. The thin film transistor array substrate as claimed in claim 1, further comprising a storage electrode overlapping the gate line with the gate insulating film therebetween to form a storage capacitor.

3. The thin film transistor array substrate as claimed in claim 1, wherein the data pad includes:
   a lower data pad electrode extending from the lower data link electrode; and
   an upper data pad electrode connected to the lower data pad electrode via a second contact hole passing through the gate insulating film and the protective film at a second area of the substrate in which the protective film is directly provided on the gate insulating film.

4. The thin film transistor array substrate as claimed in claim 1, wherein the gate pad includes:
   a lower gate pad electrode extending from the gate line; and
   an upper gate pad electrode connected via a third contact hole passing through the gate insulating film and the protective film to the lower gate pad electrode at a third area of the substrate in which the protective film is directly provided on the gate insulating film.

5. A method of fabricating a thin film transistor array substrate, comprising:
   forming a gate line, and a gate pad connected to the gate line on a substrate;
   forming a gate insulating film on the gate line;
   forming a data line crossing the gate line to define a pixel area, and a data pad connected to the data line;
   forming a protective film covering a thin film transistor provided at a crossing of the gate line and the data line;
   forming a pixel electrode provided on the pixel area, and electrically connected to a drain electrode of the thin film transistor;
   forming a lower data link electrode connected to the data line;
   forming an upper data link electrode connected to the data line and overlapping one end of the lower data link electrode; and
   forming a link electrode connecting the lower data link electrode via a first contact hole passing through the protective film and the gate insulating film at a first area in which the protective film is directly provided on the gate insulating film,
   wherein the lower surface of the link electrode is connected on the upper surface of the lower data link electrode,
   wherein the gate i insulating film and a semiconductor layer formed between the upper data link electrode and the lower data link electrode,
   wherein the first contact hole is formed at an end of the upper data link electrode adjacent to the data pad.

6. The method of fabricating a thin film transistor array substrate as claimed in claim 5, further comprising:
   forming a storage capacitor comprised of the gate line, and a storage electrode overlapped with the gate line with having the gate insulating film therebetween.

7. The method of fabricating a thin film transistor array substrate as claimed in claim 5, wherein the forming the data pad includes:
   forming a lower data pad electrode extended from the lower data link electrode; and
   forming an upper data pad electrode connected to the lower data pad electrode via a second contact hole passing through the gate insulating film and the protective film at a second area of the substrate in which the protective film is directly provided on the gate insulating film.

8. The method of fabricating a thin film transistor array substrate as claimed in claim 5, wherein the forming the gate pad includes:
   forming a lower gate pad electrode extended from the gate line; and
   forming an upper gate pad electrode connected to the lower gate pad electrode via a third contact hole passing through the gate insulating film and the protective film at a third area of the substrate in which the protective film is directly provided on the gate insulating film.

9. A method of fabricating a thin film transistor array substrate, comprising:
- forming a first mask pattern group having a gate line, a gate electrode connected to a gate line and a lower gate pad electrode, a lower data pad electrode to be connected to a data line, and a lower data link electrode connected to a lower data pad electrode on a substrate;
- forming a second mask pattern group having a gate insulating film over the first mask pattern group, a semiconductor layer formed on a gate insulating film, a data line provided on a semiconductor layer and crossing the gate line to define a pixel area, a source electrode of a thin film transistor connected to a data line, a drain electrode opposed to a source electrode, and an upper data link electrode connected to a data line and provided to overlap one end of a lower data link electrode; and
- forming a third mask pattern group including a protective film formed to cover a second mask pattern group, a pixel electrode connected to a drain electrode using a lift-off process, and a link electrode connecting a lower data link electrode exposed via a first contact hole passing through a protective film and a gate insulating film at a first area of the substrate in which the protective film is directly provided on the gate insulating film.

10. The method of fabricating a thin film transistor array substrate as claimed in claim 9, wherein the forming the second mask pattern further includes forming a storage electrode overlapped with the gate line with the gate insulating film therebetween to provide a storage capacitor.

11. The method of fabricating a thin film transistor array substrate as claimed in claim 9, wherein the forming the third mask pattern includes forming the first contact hole at an end of the upper data link electrode adjacent to the data pad.

12. The method of fabricating a thin film transistor array substrate as claimed in claim 9, wherein the forming the third mask pattern further includes forming an upper gate pad electrode connected to the lower gate pad electrode via a second contact hole passing through the protective and the gate insulating film at a second area of the substrate in which the protective film is directly provided on the gate insulating film.

13. The method of fabricating a thin film transistor array substrate as claimed in claim 9, wherein the forming the third mask pattern further includes forming an upper data pad electrode connected to the lower data pad electrode via a third contact hole passing through the protective film and the gate insulating film at a third area of the substrate in which the protective film is directly provided on the gate insulating film.

14. A thin film transistor array substrate, comprising:
- a gate line provided on a substrate;
- a data line crossing the gate line to define a pixel area;
- a gate insulating film between the gate line and the data line at the crossing of the gate line and data line;
- a protective film directly provided on the gate insulating film at first, second and third areas of the substrate;
- a gate pad connected to the gate line;
- a data pad connected to the data line;
- a lower data link electrode connected to the data line;
- an upper data link electrode connected to the data line and overlapping one end of the lower data link electrode;
- a link electrode connecting the lower data link electrode via a first contact hole passing through the protective film and the gate insulating film at the first area;
- a lower data pad electrode extending from the lower data link electrode;
- an upper data pad electrode connected to the lower data pad electrode via a second contact hole passing through the gate insulating film and the protective film at the second area;
- a lower gate pad electrode extending from the gate line; and
- an upper gate pad electrode connected via a third contact hole passing through the gate insulating film and the protective film to the lower gate pad electrode at the third area,
- wherein the lower surface of the link electrode is connected on the upper surface of the lower data link electrode,
- wherein the gate insulating film and a semiconductor layer formed between the upper data link electrode and the lower data link electrode,
- wherein the first contact hole is formed at an end of the upper data link electrode adjacent to the data pad.

15. The thin film transistor array substrate as claimed in claim 14, further comprising a storage electrode overlapping the gate line with the gate insulating film therebetween to form a storage capacitor.

* * * * *